United States Patent [19]
DeCoster

[11] Patent Number: 6,035,907
[45] Date of Patent: Mar. 14, 2000

[54] COMBINED MEASURING CUP, FUNNEL AND STRAINER UTENSIL

[75] Inventor: Pieter K. J. DeCoster, Aalst, Belgium

[73] Assignee: Dart Industries Inc., Orlando, Fla.

[21] Appl. No.: 09/135,369

[22] Filed: Aug. 17, 1998

[51] Int. Cl.[7] .................................................. B65B 39/00
[52] U.S. Cl. .......................................... 141/331; 141/335
[58] Field of Search ..................................... 141/331–343

[56] References Cited

U.S. PATENT DOCUMENTS

| | | | |
|---|---|---|---|
| D. 185,780 | 8/1959 | Tupper | D2/3 |
| D. 229,917 | 1/1974 | Swett | D7/50 |
| 559,905 | 5/1896 | Pike | 141/331 |
| 761,702 | 6/1904 | Paradis | 141/335 |
| 3,152,624 | 10/1964 | Ridley | 141/331 |
| 4,389,926 | 6/1983 | Joyner | 141/331 |

Primary Examiner—Steven O. Douglas
Assistant Examiner—Khoa D. Huynh
Attorney, Agent, or Firm—Taylor J. Ross

[57] ABSTRACT

A combined measuring cup, funnel and strainer utensil. The utensil includes a main body having a sidewall defining an upper opening and a lower opening. Material may flow through the upper and lower openings to funnel the material. An abutment flange extends outward from the sidewall, and may act as a base to support the utensil. The lower face of the abutment flange may include a plurality of shoulders to provide stability when the utensil is used as a funnel. A flow barrier includes a plug section which may block the lower opening to permit the utensil to be used as a measuring cup. The flow barrier additionally includes a handle section in the form of a fluted flange. This may be placed within the main body, with the indentations of the fluted flange forming openings for straining material within the utensil. A cover may be placed over the upper opening to seal the main body against contamination, permitting storage of the material.

3 Claims, 3 Drawing Sheets

COMBINED MEASURING CUP, FUNNEL AND STRAINER UTENSIL

CROSS-REFERENCE TO RELATED APPLICATIONS

This application is related to copending Ser. No. 29/092,340 pending which is incorporated by reference herein and made a part hereof, including but not limited to those portions which specifically appear hereinafter.

STATEMENT REGARDING FEDERALLY SPONSORED RESEARCH

Not Applicable.

BACKGROUND OF THE INVENTION

The present invention relates in general to household and kitchen utensils. In particular, the present invention relates to an improved device which may be used as a measuring cup, a funnel, and a strainer.

Numerous household tasks, including cooking, often required that certain basic acts. Among these are measuring materials, transferring materials from one container to another, and straining materials. There are numerous devices known for performing each of these individual tasks. Specifically, measuring cups are well known, as are funnels, strainers and colanders. While each of these utensils performs its function well, these individual items must be purchased individually, and require space for storage.

SUMMARY OF THE INVENTION

An object of the present invention is to provide a utensil which will measure volumes.

Another object of the present invention is to provide a utensil which will act as a funnel.

It is another object of the present invention to provide a utensil which will act as a strainer.

Yet another object of the present invention is to provide such a utensil which will perform at least two, and preferably all three of the above functions.

These and other objects are achieved by a combined measuring cup, funnel and strainer utensil. The utensil includes a main body having a sidewall defining an upper opening and a lower opening. Material may flow through the upper and lower openings to funnel the material. An abutment flange extends outward from the sidewall, and may act as a base to support the utensil. The lower face of the abutment flange may include a plurality of shoulders to provide stability when the utensil is used as a funnel. A flow barrier includes a plug section which may block the lower opening to permit the utensil to be used as a measuring cup. The flow barrier additionally includes a handle section in the form of a fluted flange. This may be placed within the main body, with the indentations of the fluted flange forming openings for straining material within the utensil. A cover may be placed over the upper opening to seal the main body against contamination, permitting storage of the material.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
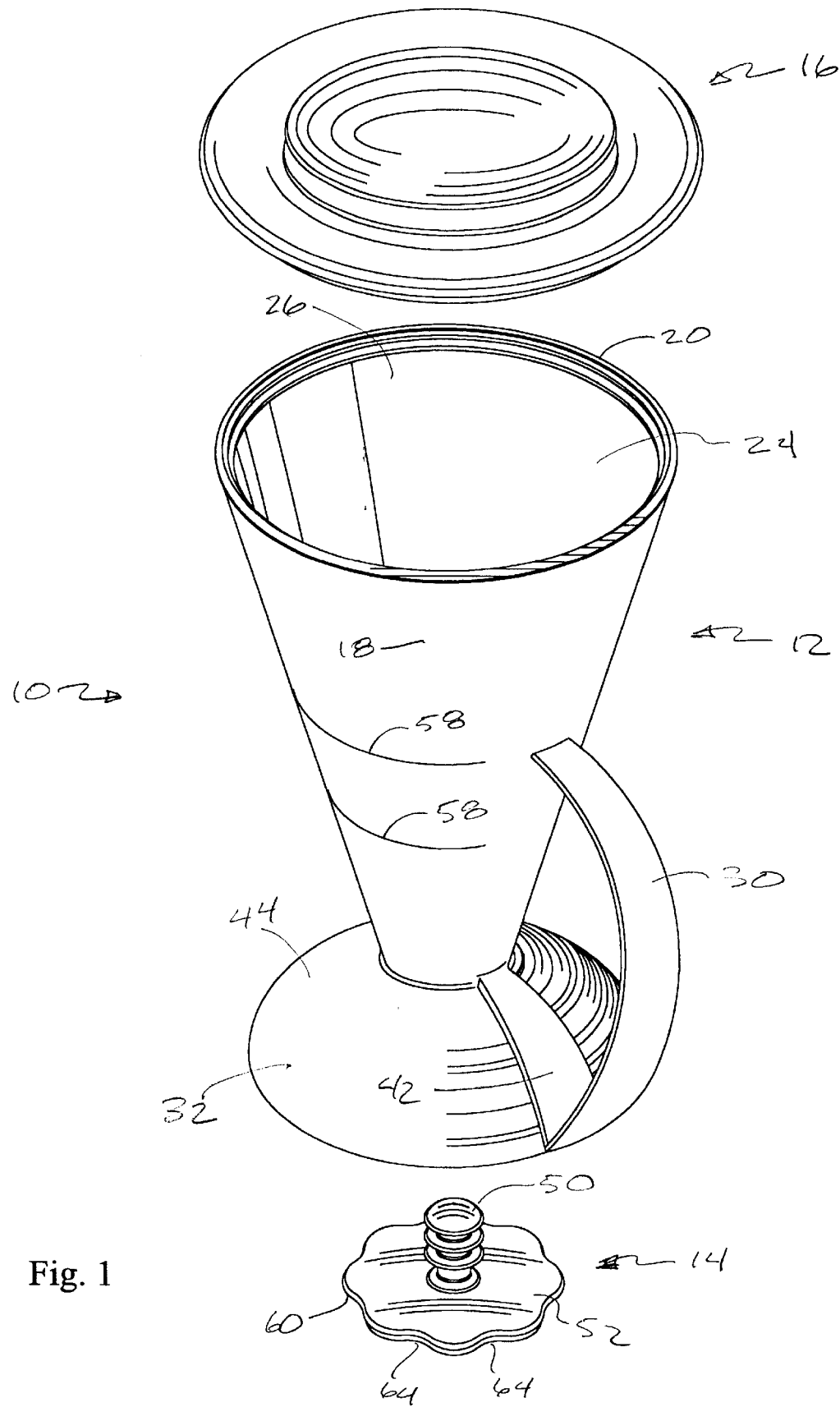
FIG. 1 is an exploded top perspective view of the elements of a utensil according to the present invention.

With reference to FIG. 1, a utensil according to the present invention is generally designated by reference numeral 10. The utensil 10 includes a main body 12 and a flow barrier 14. While not required, the utensil 10 may also be used with a cover 16. Each of these components, and their use, will be described in more detail below.

Figures 2, 3:
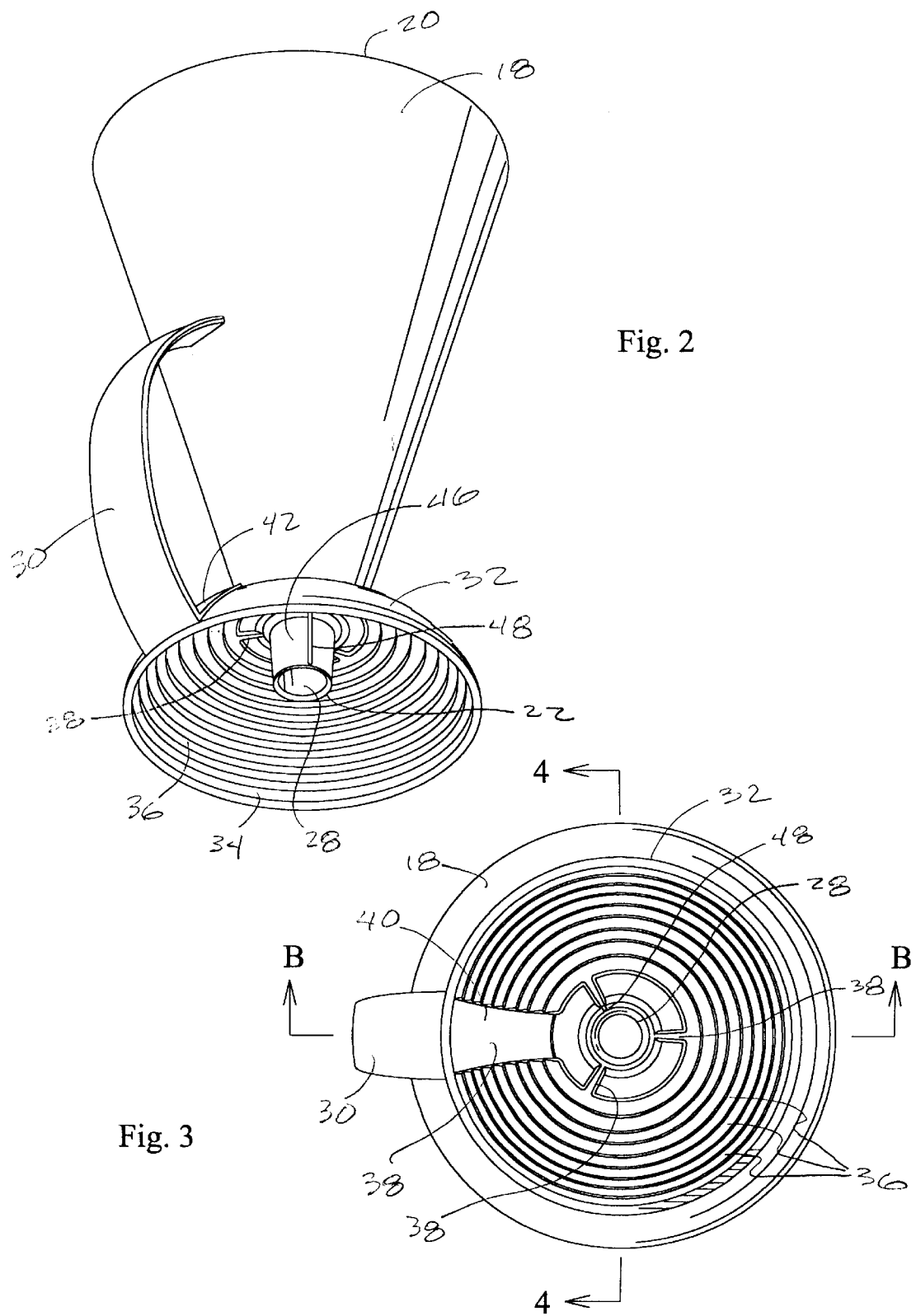
FIG. 2 is a bottom perspective view of the main body of the utensil.
FIG. 3 is a bottom plan view thereof.

The main body 12 includes a sidewall 18 extending from an upper rim 20 downward to a lower rim 22 (FIG. 2). The sidewall 18 may be formed of various materials. If used for food items, it is preferred that the sidewall 18 be formed of glass, stainless steel, or plastic. The sidewall 10 may have various cross-sectional configurations, such as square, elliptical, etc. In the preferred embodiment shown, the cross-sectional configuration is round. Similarly, the sidewall 18 may be vertical, or may taper either inward or outward toward the lower rim 22 (although the lower rim 22 preferably has a relatively small size, as discussed more fully below). In the preferred embodiment shown, the sidewall 18 tapers inward toward the lower rim 22 to take the general form of a frustum of a cone.

The sidewall 18 defines an interior 24. Material (such as liquids, powders, pastes or combinations thereof) is intended to be introduced into the interior 24 through an upper opening 26 defined by the upper rim 20. This material may exit through a lower opening 28 defined by the lower rim 22. As such, the main body 12, by itself, is essentially a conduit through which material may pass. This relates to a first function of utensil 10, which is as a funnel.

Specifically, as may be envisioned, if liquid or granular material were introduced through the upper opening 26, it would flow by gravity through the utensil 10 to exit from the lower opening 28. This is often employed to transfer the material from one container (not shown) to another. In this regard, various containers have a variety of opening sizes, with a standard bottle such as for holding wine and the like being one of the smaller opening sizes. To permit the widest use of the utensil 10, it is preferred that the lower rim 22 be sized to be received within such a bottle opening. This is shown in the preferred embodiment.

As is known, tapering the sidewall 18 will cause the outer surface of the sidewall to abut against the interior of any container opening having a size between that of the upper rim 20 and lower rim 22. This may provide stability during use as a funnel. To provide further stability, a handle 30 may extend outward from the sidewall 18 for manual grasping. While these arrangements are acceptable, it is preferred to provide the utensil 10 with even greater stability.

Specifically, it is preferred to provide an abutment flange 32 extending outward from the sidewall 18 in proximity to the lower rim 22. The abutment flange 32 includes a lower face 34 which is intended to abut against the rim of the container. In the embodiment shown, the abutment flange 32 takes the form of a peripherally continuous, radially extending flange. The abutment flange 32 need not be peripherally continuous, however, and two or more peripherally spaced elements could be used. In a similar manner, the abutment flange 32 could extend directly from the lower rim 22. However, it is preferred that the abutment flange 32 be spaced from the lower rim 22 a short distance, as shown, to provide better flow characteristics for material exiting the lower opening 28.

Figure 4:
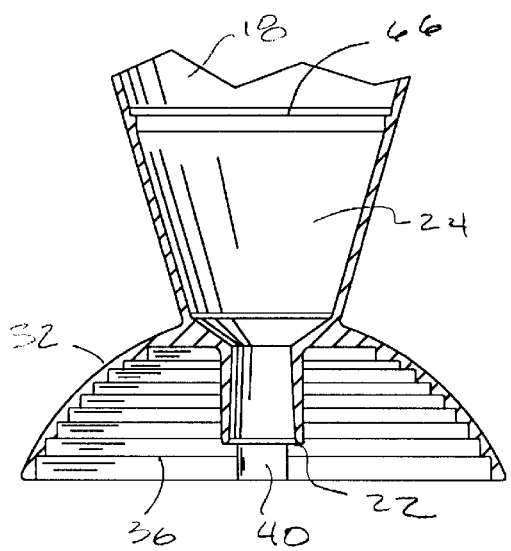
FIG. 4 is a detail cross-sectional view along line 4—4 of FIG. 3.

The abutment flange 32, and more particularly the lower face 34, may be planar, may taper outward in the upward direction (i.e., toward the upper rim 20), or may, as shown, taper outward in the downward direction. In addition it is preferred that this outward taper decrease with distance, to form a section of a sphere or ellipsoid, as shown. As may be envisioned, the rim of the container will abut against the lower face 34, with the concave shape of the abutment flange 32 providing stability. This may even provide sufficient stability that the user need not hold the utensil 10 in position on the container. To ensure greater stability, however, it is preferred that the lower face 34 not be smooth, but rather include a series of concentric ledges defining concentric downward-facing shoulders 36, best shown in FIG. 4. Each of these shoulders 36 lies in a plane perpendicular to the longitudinal axis (not shown) of the main body 12.

As may be envisioned, the rim of the container may rest upon one of the shoulders 36 which has a similar diameter. This will provide even greater stability. It may, however, cause a different problem. Specifically, as material flows from the utensil 10 into the container, the air in the container will be forced out. If the container rim abuts fully about the associated shoulder 36, it may be difficult for this air to escape.

Figure 5:
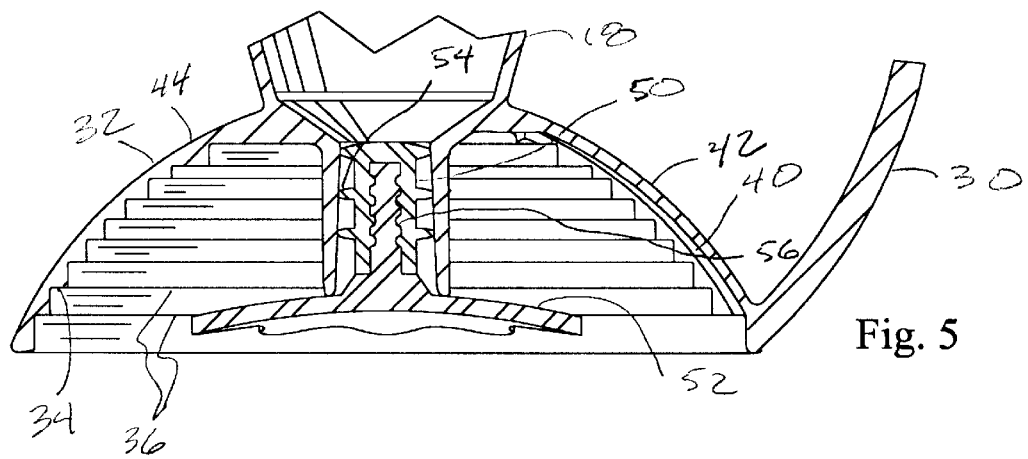
FIG. 5 is a detail cross-sectional view along line B—B of FIG. 3 with the flow barrier in a blocking position.

To eliminate this problem, the shoulders 36 may be formed with one or more vent channels 38. In the embodiment shown, the shoulder 36 having the smallest diameter includes three radially extending vent channels 38 spaced at equal distances about its periphery. Other numbers could of course be provided. The remaining shoulders 36 each share a common vent channel 38 extending radially along the lower face 34 of abutment flange 32, with this common vent being referred to as a main vent 40. As best shown in FIG. 5, main vent 40 takes the form of a channel communicating with each of the shoulders 36. As the main vent 40 extends into the material forming the abutment flange 32, the abutment flange 32 must either have a thickness sufficient to permit this, or may include a raised section 42 on an upper face 44 of the abutment flange 32. This raised section 42 may extend along the same radial plane as handle 30, with one end of the handle 30 connected to the main body 12 and the other end connected to the abutment flange 32. This placement of the handle 30 not only improves aesthetics, but reduces the radial extent of the handle 30, allowing storage of the utensil 10 in a smaller area.

As noted above, it is preferred that the abutment flange 32 be spaced upward from the lower rim 22 by a short distance to improve flow of material leaving the main body 12. The section of the sidewall 18 below the abutment flange 32 thus defines a spout 46. The length of this spout 46 is preferably less than the height of the abutment flange 32, such that the lower rim 22 is spaced vertically above the lowermost of the shoulders 36. This will permit this lowermost shoulder 36 to act as a base and support the main body 12 in an upright position for storage.

Additionally, while the vent channels 38 permit escape of air, a similar problem may exist if the spout 46 is employed. Specifically, the spout 46 will preferably have a size to fit within the mouth of a bottle to ease use. However, if the fit is too close, the air will not escape from between the spout 46 and container mouth. To prevent this, the spout 46 may include one or more spacer ribs 48 extending longitudinally along its outer surface. The spacer ribs 48 will space the spout 46 from the container mouth, forming passages between the spacer ribs 48 which allow escape of air from the container.

The use of the main body 12 as a funnel is generally similar to prior art devices. The main body 12 is placed over the container with the lower rim 22 within the periphery of the container mouth. This may cause the spout 46, if used, to enter into the mouth of certain containers. If possible, the main body 12 is lowered until the abutment flange 32 rests upon the mouth of the container (preferably with the shoulders 36 being used for this abutment). If not possible, the user will hold the main body 12 in position above the container. The material is introduced to the main body 12 through the upper opening 26, and flows through the main body 12 by force of gravity. The sidewall 18 guides the material to the lower opening 28, where the material exits the main body 12 and flows into the container. This is continued until the user halts introduction of the material into the main body 12. During this process, air is displaced from the container, and preferably is allowed to escape via the vent channels 38.

While the above arrangement provides a versatile and convenient funnel, it is preferred to provide additional uses for the utensil 10. To this end, the utensil 10 preferably includes the flow barrier 14. With this flow barrier, the utensil 10 may be used as a measuring cup, as well as a funnel.

The flow barrier 14 may take any form which permits it to create a removable and reusable obstruction to material flow from the lower opening 28. In the preferred embodiment, the flow barrier 14 includes a plug section 50 and a handle section 52. The plug section 50 is sized to be selectively received within the lower opening 28, as shown in FIG. 5. This location of the flow barrier 14 will be referred to as the blocking position. When in this blocking position, the plug section 50 has a sufficiently close fit with the lower opening 28 to halt flow of material (preferably including fluids) therethrough, while still permitting manual insertion and removal from the lower opening 28.

The flow barrier 14 may be formed from a variety of materials, such as cork, rubber, etc. An elastomeric plastic material is preferred, however. To provide the desired fit, the plug section 50 may include a plurality of sealing flanges 54 extending radially outward from the periphery of the plug section 50 at longitudinally spaced positions. These sealing flanges 54 will engage against the lower opening 28 to halt flow of material, but are sufficiently flexible to permit easy insertion and removal of the plug section 50.

The handle section 52 may comprise a simple, rod-shaped extension of the plug section 50, and be formed of the same material. However, if the plug section 50 is formed of an elastomeric material, additional strength may be required. To this end, the handle section 52 may be formed of a relatively rigid material, such as a metal or plastic. To join the plug section 50 to the handle section 52, it is preferred to form the handle section 52 with a mounting extension 56 extending therefrom, and to form the plug section 50 as a sleeve covering at least the free end of the mounting extension 56, as shown.

Again, the handle section 52 could take the form of a simple extension of the plug section 50, even if formed of a different material. In this regard, it is noted that the length of the handle section 52 is preferably chosen such that it does not extend below the plane of the lowermost shoulder 36 (if the abutment flange 32 is used), to retain the use of the abutment flange 32 as a base for supporting the main body 12.

As may be envisioned, placing the flow barrier 14 in the blocking position will halt flow of material through the main body 12, thus causing any material introduced through the upper opening 26 to be retained within the main body 12. As such, material may be introduced until the desired quantity is accumulated. To aid in determining the amount of contents, indicia lines 58 may be formed on the sidewall 18. Once accumulated, the material may be removed from the utensil 10 either by tilting the main body 12 to pour the contents from the upper opening 26, or by removing the plug section 50 to permit the material to flow from the lower opening 28. It is noted that the material may be removed immediately, or may be held until a later time. If held, the cover 16 may be placed over the upper rim 20 to prevent contamination. Most preferably, the cover 16 may act as a seal, and additionally prevent accidental spilling of the material from the main body 12.

While the handle section 52 could be a simple extension, forming the handle section 52 with a particular form may provide advantages. For example, in the embodiment shown, the handle section 52 takes the form of a flange extending outward from the lower end of the plug section 50. It may be readily seen that such a shape would provide a good surface for manually grasping to move the flow barrier 14 to and from the blocking position. Further, if the abutment flange 32 was not employed, or was in a form not providing a base, such a flange-shaped handle section 52 could act as a base to support the main body 12 in an upright position.

Yet another use may be made of a flanged-shaped handle section 52, and this is to permit the utensil 10 to act as a strainer. Specifically, the handle section 52 has an outer periphery 60 which may be sized to pass through the upper opening 26, but not the lower opening 28. This is most preferably achieved by using the cone-shaped sidewall 18 and forming the outer periphery 60 with a size between that of the upper rim 20 and lower rim 22. With this size of outer periphery 60, the flow barrier 14 may be placed within the main body 12, and the outer periphery 60 will abut against the interior face of the outer periphery 60 at a straining position (shown in FIG. 6) intermediate the upper rim 20 and lower rim 22, forming an obstruction to passage of material through the main body 12. Since a strainer by definition permits some material to pass through, the flow barrier 14 should not be a total obstruction, but rather a partial obstruction. To this end, the handle section 52 is formed to define a plurality of openings 62 therethrough.

The openings 62 could take the form of apertures (not shown) located within the outer periphery 60, and extending through the handle section 52. Alternatively, the outer periphery 60 may be formed with a plurality of indentations 64 extending inward at spaced locations about the periphery. These indentations 64 provide the outer periphery 60 with a fluted pattern which defines the openings 62, since the indentations 64 are spaced from the interior face of the sidewall 18.

Figure 6:
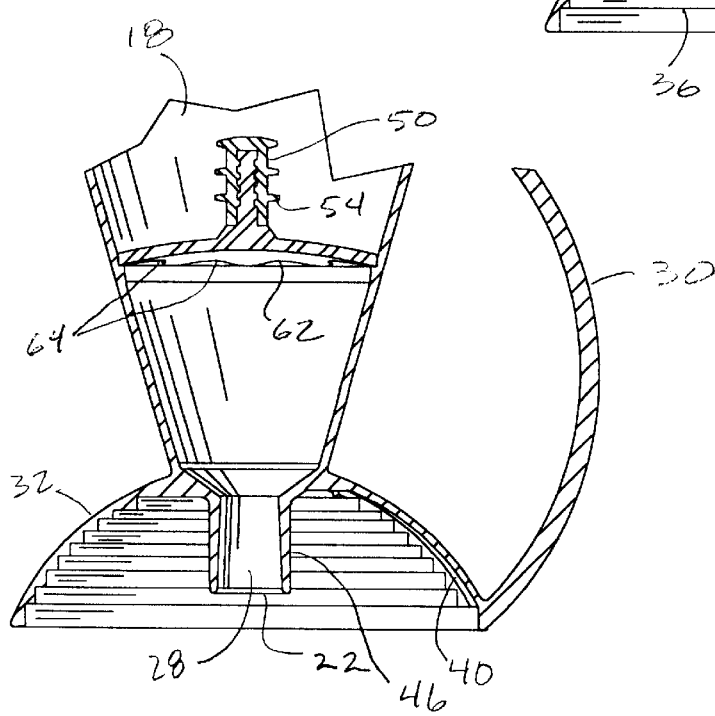
FIG. 6 is a detail cross-sectional view along line B—B of FIG. 3 with the flow barrier in a straining position.

The flow barrier 14 may be held in the straining position of FIG. 6 simply by friction of the outer periphery 60 against the sidewall 18. However, to provide additional stability, the interior face of the sidewall 18 may be provided with a peripheral protrusion defining an upward facing mounting shoulder 66, as shown in FIG. 5. The flow barrier 14 will abut against the mounting shoulder 66, holding it securely in the straining position, yet permitting easy manual removal from the straining position.

As may be envisioned, to employ the utensil 10 as a strainer, the flow barrier 14 is placed within the main body 12, and specifically into the straining position of FIG. 6. During this operation, the user may advantageously grasp the plug section 50 to manipulate the flow barrier 14. A quantity of material to be strained (such as olives in oil, fruit segments in syrup, etc.) is then introduced to the main body 12 through the upper opening 26. The portions of the material which are liquid or smaller than the openings 62 will flow therethrough, while the portions of the material which are larger will be held by the flow barrier 14. To assist in ensuring all of the liquid or smaller portions flow through, the upper face of the handle section 52 may be formed with a downward concave surface, as shown. This will tend to force flow by gravity to the openings 62. The material which passes through the flow barrier 14 may exit the utensil 10 through the lower opening 28, and either be disposed of or flow to an appropriate container as described above for use as a funnel. Alternatively, a second flow barrier 14 could be placed in the blocking position to retain the material in a position below the flow barrier 14. The material within the main body 12 could be used immediately, or could be sealed therein by use of cover 16 as described above until ready for use.

As be seen, the invention described above may be used in a number of ways, and fulfils multiple functions. Specifically, it may be used as a funnel, a measuring cup, and a strainer. Additionally, by application of cover 16, the main body 12 may also act as a storage container. The utensil 10 therefore provides increased functionality and ease of use while requiring minimal storage space.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A utensil, comprising:
    a main body having a sidewall defining an upper opening and a lower opening;
    an abutment flange extending outward from said sidewall at a position in proximity to said lower opening, said abutment flange having a downward concave configuration adapted to abut against a rim of a container; and
    a flow barrier, said flow barrier including a plug section selectively receivable in a blocking position within said lower opening to seal said lower opening against egress of material, and a handle section extending from said plug section for manual grasping for movement into and out of a blocking position, said handle section taking the form of an outward extending peripheral flange having a size to be received within said main body in a straining position intermediate said upper opening and said lower opening, and wherein said handle section defines a plurality of openings of a size to permit straining of material within said main body.

2. A utensil as in claim 1, wherein said handle section includes a periphery having a plurality of indentations, said indentations defining said opening when said handle section is in said straining position.

3. A utensil, comprising:

a main body having a sidewall defining an upper opening and a lower opening, and an abutment flange extending outward from said sidewall at a position in proximity to said lower opening, said abutment flange having a downward concave configuration adapted to abut against a rim of a container, a lower face of said abutment flange including a plurality of concentric downward facing abutment shoulders, and wherein a lowermost one of said abutment shoulders is located at a position below said lower opening, such that said lowermost one of said abutment shoulders defines a base upon which said main body may rest, and at least one vent channel extending through said abutment shoulders and permitting fluid communication therebetween.

* * * * *